US009235860B1

(12) United States Patent (10) Patent No.: US 9,235,860 B1
Boucher et al. (45) Date of Patent: Jan. 12, 2016

(54) METHODS AND SYSTEMS FOR GUIDING CONSUMERS IN CATEGORY-BASED TRANSACTIONS

(75) Inventors: Lisa M. Boucher, Seattle, WA (US); Viplav S. Mishra, Seattle, WA (US); Sarah M. Richards, Shoreline, WA (US); Natalie J. Rendon, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 647 days.

(21) Appl. No.: 13/415,242

(22) Filed: Mar. 8, 2012

(51) Int. Cl.
*G06Q 30/00* (2012.01)
*G06Q 30/06* (2012.01)

(52) U.S. Cl.
CPC ........ *G06Q 30/0641* (2013.01); *G06Q 30/0613* (2013.01)

(58) Field of Classification Search
CPC ............ G06Q 3/0601; G06Q 30/0641; G06Q 30/0613
USPC ................................................ 705/26.1, 27.1
See application file for complete search history.

(56) References Cited

U.S. PATENT DOCUMENTS

| 7,603,292 | B1 * | 10/2009 | Bragg et al. ............... 705/26.35 |
| 8,433,623 | B2 | 4/2013 | Lawrence et al. |
| 8,630,913 | B1 * | 1/2014 | Lawrence et al. ............ 705/26.1 |
| 2012/0054060 | A1 * | 3/2012 | Kundu ......................... 705/26.5 |
| 2013/0117151 | A1 | 5/2013 | Macaisa et al. |

OTHER PUBLICATIONS

ShopTok Introduces Gift Advisor Hosted Gift Registry Application for Online Retailers. Business Wire. Nov. 8, 1999. Business Editors/High Tech Writers.*

* cited by examiner

*Primary Examiner* — Courtney Stopp
(74) *Attorney, Agent, or Firm* — Athorus, PLLC

(57) ABSTRACT

A system and method for guiding consumers through category-based transactions leads consumers through the creation of registries or shopping lists by displaying a group of items in a series of categories, and selecting one or more of the items within the categories. A user's progress in creating the registry may be displayed in a persistent menu bar that remains displayed on an interface as the user advances from one category to another. The systems and methods may be utilized by one or more users to create an electronic baby registry or wedding registry, to prepare for any event, or to enhance any category-based shopping experience at an online marketplace.

23 Claims, 8 Drawing Sheets

FIG. 4A

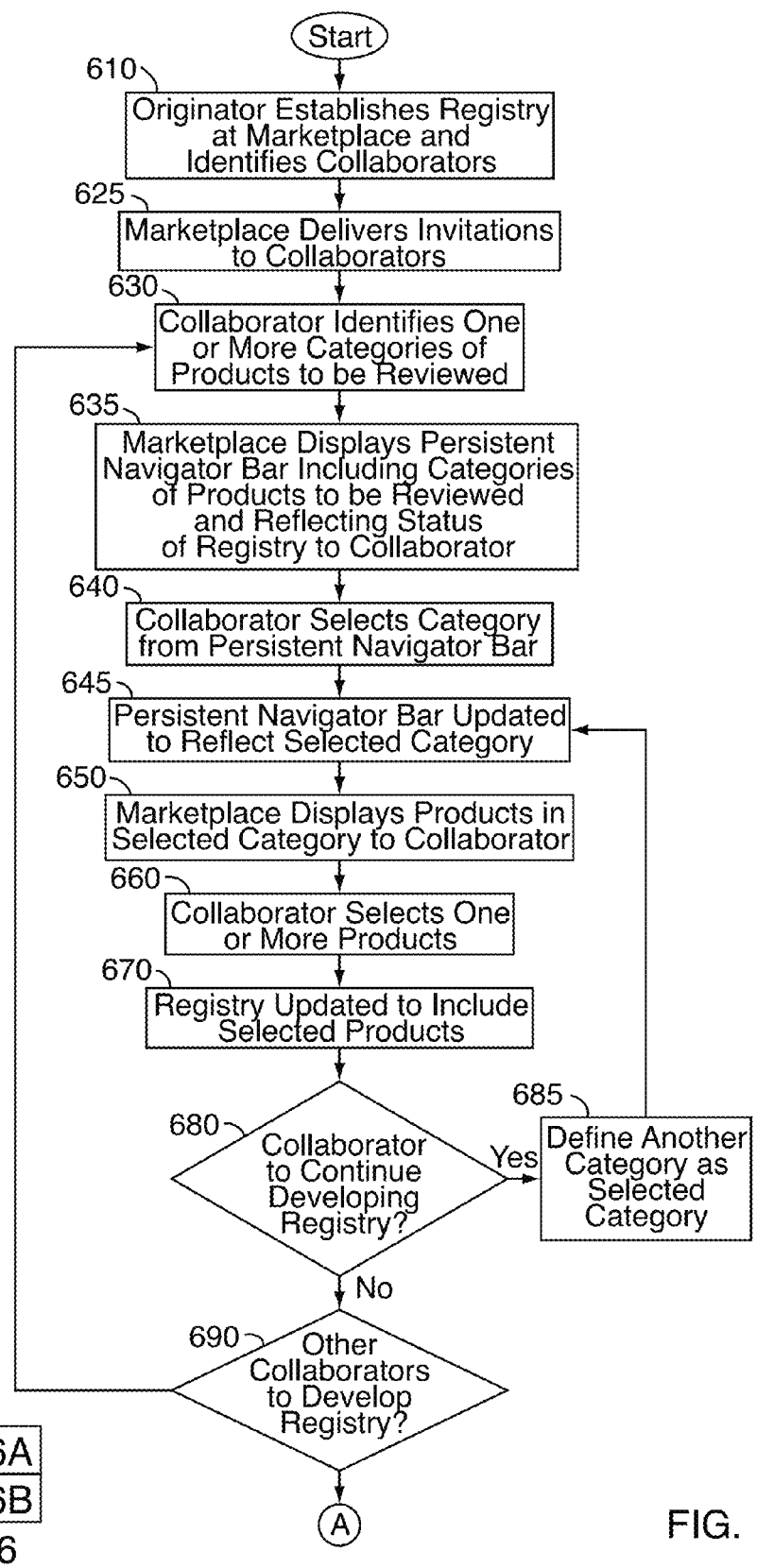

700 — Tailgating Planner

702 — Game: Maryland Terrapins (2-0) at Connecticut Huskies (2-0)
704 — East Hartford, CT   September 14, 2013, 12PM
Forecast: Sunny, High 63°F, Low 42°F 710
720 — breakfast
722 — lunch
724 — beverages
726 — decorations
736
738

740 — Themes
742 — Home Team
744 — Visiting Team
746 — Halloween

750 — Details
751 — No. of Guests [06]
752 — ☒ Gas Grill
753 — ☐ Charcoal Grill
754 — ☒ Tent/Covering 760 — Total Cost: $35
762 — Cost per Person: $5.83

770
772 — Lunch Ideas
780 — 1. Mucke Hot Dogs   $4.99/lb
781 — Mucke's Meat Products
783 — [Add to Registry]
Goes well with Arnold Select — 782
Hot Dog Rolls — 785
784 — 2. Oscar Meyer Franks Classic   $3.99/lb
Oscar Meyer Foods Corp.
787 — [Add to Registry]
Try with Gulden's Mustard — 786
778
776
777

FIG. 7

METHODS AND SYSTEMS FOR GUIDING CONSUMERS IN CATEGORY-BASED TRANSACTIONS

BACKGROUND OF THE INVENTION

Presently, online marketplaces enable consumers to review and order items for purchase by entering search terms, or keywords, into a search engine, or by selecting a broad category and exploring a list of items within that category, or among other items relating to that category. Such search-based or category-based systems are effective at identifying items when a consumer knows, either generally or specifically, what he or she is looking for. For example, a consumer searching for a bicycle may enter keywords such as "bicycle," "Huffy," or "Schwinn Crest" into a search engine, and receive information regarding dozens of different bicycles. Likewise, a consumer interested in buying sneakers may select a category "Clothing," a subcategory "Shoes," and a sub-subcategory "Sneakers" in order to review information regarding different types and models of sneakers. The power and potential of the contemporary online marketplace is limited only by the creativity of the user and the availability of the product offerings at the online marketplace.

Despite their capacity to expose users to information regarding a wide variety of available items, online marketplaces may be overwhelming to users in certain circumstances, such as when a user is not experienced in searching for items for a particular experience or event; when the user is searching for items across multiple categories; or when the user simply would like more guidance in navigating through the items available at an online marketplace. In such circumstances, the standard search-based or category-based methods for identifying desired items at an online marketplace are often insufficient.

For example, where a first-time parent is preparing a baby registry at an online marketplace, he or she may not know which items are essential upon the baby's arrival (e.g., a car seat for driving the baby home from the hospital), and which items may be merely desirable or are not immediately necessary (e.g., baby toys or shoes). Where a first-time bride is preparing a wedding registry, she may not know what types of appliances, furniture, window dressings or bath accessories she should select for inclusion in her registry. Also, where someone is planning a party or significant event, such as a wedding reception, he or she may not be aware of everything that he or she needs to know in order to host a successful party or event (i.e., recommended photographers, reception halls, chefs or bakers), or may simply want automated, guided assistance through the planning process.

Furthermore, it is believed that none of the existing systems and methods for engaging in electronic commerce is able to provide guided shopping experiences to users, including recommendations as to specific types or categories of items to be added to a registry or other list of items to be purchased by or on behalf of a user.

BRIEF DESCRIPTION OF THE DRAWINGS

FIGS. 4A and 4B are user interfaces for creating a registry in accordance with embodiments of the present disclosure.

FIGS. 6A and 6B are a flow chart of a method for creating a registry at an online marketplace, in accordance with embodiments of the present disclosure.

FIG. 7 is a user interface for planning an event at an online marketplace, in accordance with embodiments of the present disclosure.

DETAILED DESCRIPTION

Figure 1:
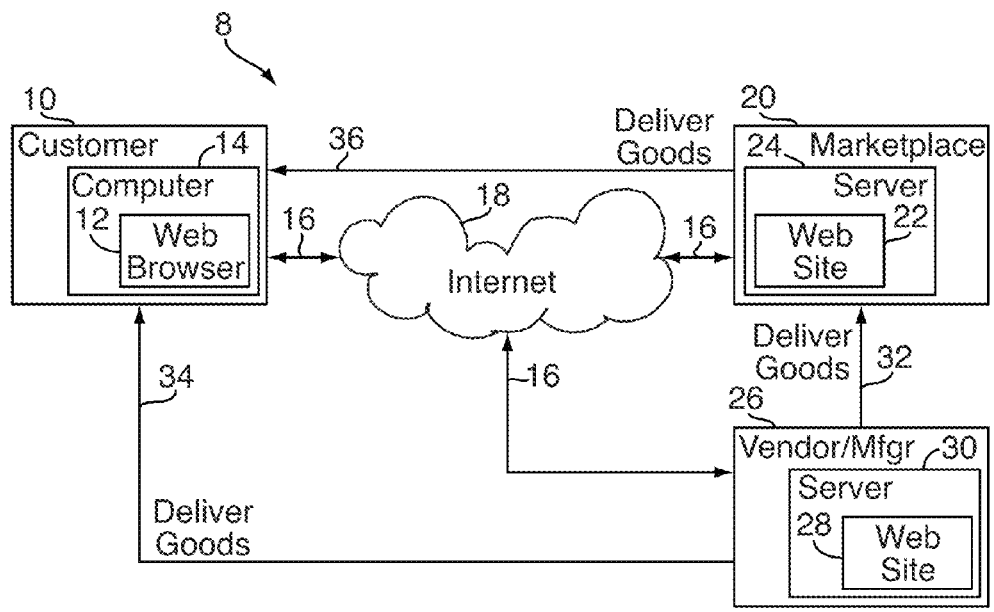
FIG. 1 is a block diagram of the components of an electronic commerce shopping system, in accordance with embodiments of the present disclosure.

As is set forth in greater detail below, the present disclosure is directed to systems and methods for guiding consumers through category-based transactions in electronic commerce. Specifically, the present disclosure describes systems and methods that allow consumers to identify an experience or an event for which they wish to select items, or an occasion that they intend to plan, and guide the consumers on a step-by-step basis through a selection process at an online marketplace. The systems and methods of the present invention may lead consumers through category-based transactions by requesting personalized information regarding the consumer or the consumer's goals or purposes in conducting the transactions, and using that information to present product offerings at the online marketplace in a more efficient manner. Accordingly, the systems and methods of the present invention may assist users in navigating through what can be unfamiliar or daunting processes, and enhance the consumer's shopping experience thereby. In a preferred embodiment, the systems and methods of the present disclosure provide a persistent and interactive interface that remains open and visible to the consumer, and displays information indicative of the consumer's progress through the shopping experience.

According to one embodiment of the present invention, Jason and Jennifer are planning for the arrival of their twin boys, who are due to be born in several months. As first-time parents, neither Jason nor Jennifer has experience in shopping for important items for babies. Therefore, Jason and Jennifer log into an online marketplace to create a baby registry, and utilize the systems and methods of the present invention guide them through the process of identifying needed items. First, Jason and Jennifer are presented with an array of product categories, each of which is common to a baby registry, such as "Strollers," "Car Seats," "Bottles" and "Diapers," and are prompted to select one category as a starting point for creating their registry. Next, a screen including a persistent interface containing each of these categories is displayed in a slider bar, and a list of items in the selected category is displayed in a scrolling section. Also displayed are a series of buttons corresponding to themes, such as "Boys," "Girls" or "Multiples." Because they are expecting twins, Jason and Jennifer select the theme buttons corresponding to "Multiples" and "Boys," and then select buttons or links to add one or more items in the selected category to their registry. The marketplace then advances Jason and Jennifer to the next category and displays products in that category relating to "Multiples" and "Boys," until Jason and Jennifer have reviewed each of the categories and selected, or declined to select, at least one item in each of the categories. For example, the marketplace may display models of double-baby strollers, matching car seats, blue-colored bottles or diapers in bulk, and other items in the respective categories shown in the slider bar, that are consistent with the selected themes of "Multiples" and "Boys."

According to another embodiment of the present invention, Sarah is getting married for the first time. Sarah, who considers herself to be environmentally conscientious and lives in an apartment in the city, logs onto an online marketplace to create a bridal registry. After Sarah selects "urban" and "green" as themes for her registry, the online marketplace then guides Sarah through various categories of items from which other brides have added items to their registries, such as "Cookware," "Cutlery" and "Electronics." Beginning with a first category, the marketplace displays recommended items that are compact in size or otherwise compatible with her apartment (consistent with the "urban" theme) and are either energy efficient or manufactured from recycled materials (consistent with the "green" theme). After Sarah selects one or more items in the first category, the selected items are added to her registry, and recommended items in a second category are displayed to Sarah. This process continues until the registry guides her through each of the categories for reviewing bridal registry gifts, and provides recommended items consistent with her selected themes. Sarah may then instruct the systems and methods of the present invention to send electronic messages to each of her wedding guests, inviting them to view the registry, and may also authorize certain individuals, such as the members of her wedding party or her mother, to make changes to the registry.

According to another embodiment of the present invention, Emily learned that she is due to deliver a baby boy in the spring, and logged into an online marketplace to create a baby registry. Because the baby boy will be her first child, Emily is unsure as to what items or categories of items should be added to her registry. Therefore, Emily provided the marketplace with the electronic mail addresses of her cousins, Julie and Jennifer, who each gave birth to baby boys in the previous year, and asked them to visit the marketplace and to recommend categories of items for inclusion on her registry. When Julie and Jennifer visited the marketplace, each added certain categories of items to Emily's registry. For example, Jennifer may add categories of "Baby Monitors" and "Baby Gates," while Julie may add categories of "Play Yards," "Baby Furniture" and "Bathtubs" to the registry. Once Emily returns to the marketplace to complete her registry, a persistent menu bar containing icons corresponding to each of the categories added by Julie and Jennifer may be displayed. Emily may then elect to keep or delete any of the categories that were added by either Julie or Jennifer, and may also add additional categories of items to her registry. Once Emily has decided which of the categories of items she would like to include in her registry, the marketplace also prompts Emily to select one of the icons in the persistent menu bar, and displays a plurality of recommended items in the category corresponding to the icon she selected. Emily may then add one or more of the displayed recommended items to her registry, and may advance between categories by selecting one or more additional icons in the persistent menu bar until she has reviewed recommended items in each of the categories. Additionally, Emily may also instruct the marketplace to invite her friends and family to review the registry and order one or more items for her soon-to-arrive baby boy.

According to yet another embodiment of the present invention, Sean is planning a New Year's Eve party for some friends and their guests at his home. Because Sean has never planned a New Year's Eve party before, Sean visits an online marketplace to begin planning his party. Sean selects "Roaring Twenties" as the theme for his party, and the systems and methods of the present invention guide Sean through various categories of items that he should consider ordering in order to host a successful party, including appropriate hors d'oeuvres, utensils and disposable glasses and champagne for toasts, as well as music, decorations and attire consistent with the "Roaring Twenties" theme Sean selected.

The systems and methods described herein may be utilized to provide a guided and structured shopping experience to a consumer, and to appropriately narrow a consumer's focus to recommended or themed items within each of a series of categories. For example, the systems and methods described herein may be utilized to create a gift registry in advance of a child's birth, a wedding shower or reception, or a housewarming party. The systems and methods described herein may also be used to provide guidance to consumers who are compiling a shopping list or other list of items to be purchased in anticipation of a significant event, such as a wedding reception, a holiday gathering, or a funeral reception.

The systems, computers, servers, and the like described herein have the necessary electronics, software, memory, storage, data sources, firmware, logic/state machines, microprocessors, communication links, displays or other visual or audio user interfaces, printing devices, and any other input/output interfaces to perform the functions described herein and/or achieve the results described herein.

Referring to FIG. 1, the various components of an embodiment of an interactive system 8 that may be used with the present disclosure are shown. The system 8 includes a customer 10 (or user, consumer, client, shopper or buyer) and an electronic commerce or Internet-based marketplace (or supplier, retailer, seller, reseller or distributor) 20. The customer 10 can be any entity or individual that wishes to purchase, rent, lease, borrow, or otherwise obtain items (which may include, but are not limited to, goods, products, services, information or media of any type or form) from the marketplace 20 using a client application, such as a web browser 12 running on a computer 14. The marketplace 20 itself may be an entity that sells or otherwise makes items available for purchase, rent, lease or borrowing by customer 10 from a marketplace website 22 which is implemented using one or more physical computer servers 24. The customer 10 operates a computer 14 that is connected to or otherwise communicates with the marketplace server 24 through a communications network 18, such as the Internet, as indicated by lines 16, by sending and receiving of digital data over the communications network 18. The web browser 12 provides one or more user interfaces for the customer to view and/or communicate with the marketplace website 22.

In addition, one or more of the items offered for sale by the marketplace 20 or ordered by the customer 10 may be made by or obtained from one or more third party vendors (or merchants or manufacturers) 26. Also, the marketplace 20 may be a merchant or vendor 26. The vendor 26 is an entity that manufactures or has access to items that the marketplace 20 desires to supply to the customer 10, and may sell the items to the marketplace 20 through a vendor website (or other type of order processing system) 28, which is implemented using one or more physical computer servers 30. The vendor computer server 30 is connected to or communicates with the marketplace server 24 and the computer 14, through the communications network 18, as indicated by lines 16. If used by the marketplace 20, the vendor 26 may deliver the desired items to either the marketplace 20 or to the customer 10, as indicated by the lines 32, 34, respectively. If the goods are delivered to the marketplace 20 from the vendor 26, the marketplace 20 then delivers the items to the customer, as indicated by a line 32. There may be more than one vendor 26 that supplies items to the marketplace 20 and/or the customer 10. Also, those of skill in the pertinent art will recognize that the customer 10 may use a keyboard, keypad, mouse, stylus, touch screen, or other device (not shown) or method for interacting with the computer 14 and/or web browser 12, or to "select" an item, link, node, hub or any other aspect of the present disclosure.

The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "marketplace" or "vendor" refers to the associated computer systems operated or controlled by a marketplace or vendor, respectively. Thus, process steps described as being performed by the "marketplace" or the "vendor," may be automated steps performed by their respective computer systems. These steps are implemented within software modules (or computer programs) executed by one or more general purpose computers. For example, the web browser (or user interface) 12 may be implemented on the computer 14 using one or more software applications. Specially designed hardware could, alternatively, be used to perform certain operations. Moreover, process steps described as being performed by a "customer" are typically performed by a human operator via the computer 14, but could, alternatively, be performed by an automated agent.

The customer 10 may use any web-enabled or Internet applications, such as the web browser 12, or any other client-server applications or features including electronic mail (or E-mail), or other messaging techniques to communicate with (or connect to) the marketplace website 22 and/or server 24 through the communications network 18, such as short or multimedia messaging service (SMS or MMS) text messages. In addition, the computer 14 may be any of a number of computing devices that are capable of communicating over the network, including but not limited to set-top boxes, personal digital assistants, mobile phones including "smart" phones, digital media players, Web pads, tablets, laptop computers, desktop computers, electronic book readers, and the like. The protocols and components for providing communication between the customer computer 14 and the marketplace website 22 and/or server 24 are well known to those skilled in the art of computer communications and thus, need not be described in more detail herein.

The data and/or computer executable instructions, programs, firmware, software and the like (also referred to herein as "computer executable components") described herein may be stored on a computer-readable medium that is within or accessible by the customer computer 14 and/or the marketplace server 24, having sequences of instructions which, when executed by a processor (such as a central processing unit, or CPU), cause the processor to perform all or a portion of the functions and/or methods described herein. Such computer executable instructions, programs, software and the like may be loaded into the memory of the customer computer 14 or the marketplace server 24, using a drive mechanism associated with the computer readable medium, such as a floppy drive, CD-ROM drive, DVD-ROM drive, network interface, or the like.

The data and/or computer executable instructions, programs, firmware, software and the like (also referred to herein as "computer executable components") described herein may be stored on a computer-readable medium that is within or accessible by the computers and/or servers having sequences of instructions which, when executed by a processor (or CPU), cause the processor to perform all or a portion of the functions and/or methods described herein. Such computer executable instructions, programs, software and the like may be loaded into the memory of the computer 14 or the servers 24, 30 using drive mechanisms associated with the computer-readable medium, such as a floppy drive, CD-ROM drive, DVD-ROM drive, network interface, or the like, or via external connections.

The systems and methods of the present invention are generally directed to providing a consumer with a guided shopping experience by displaying groups of recommended items to the consumer sorted by category, wherein the recommended items may correspond to one or more themes, and guiding the consumer from category-to-category until he or she has viewed items in each of the categories and/or added items in each of the category to a registry or shopping list. Additionally, according to some embodiments of the present invention, consumers may track their progress through a persistent user interface that remains displayed as they advance from category to category reviewing recommended items. Moreover, according to some other embodiments of the present invention, items or categories of items may be recommended to the consumer or selected for inclusion in a registry or shopping list by third parties, such as the consumer's friends, family or acquaintances.

Figure 2:
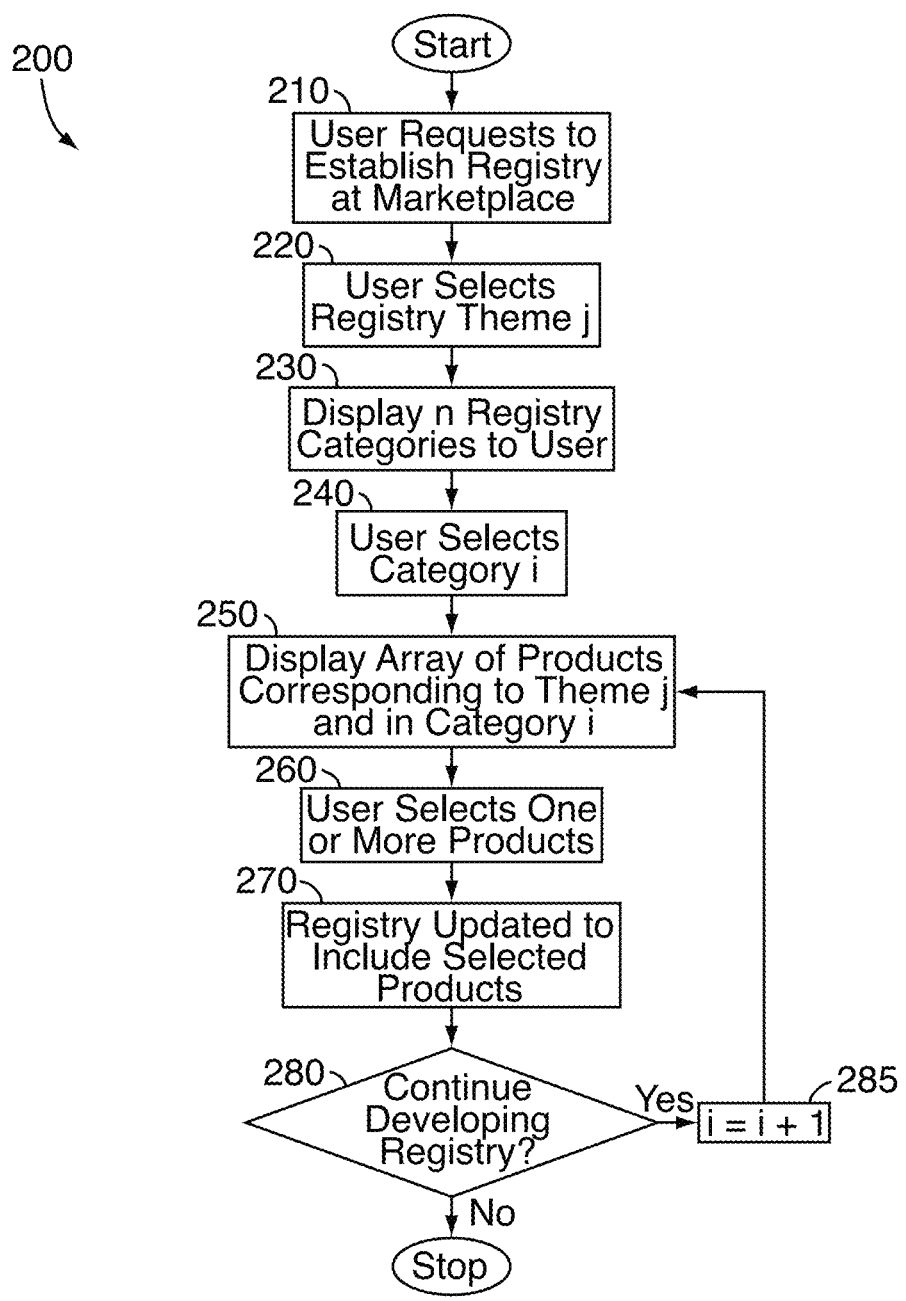
FIG. 2 is a flow chart of a method for establishing a registry at an online marketplace, in accordance with embodiments of the present disclosure.

Referring to FIG. 2, a flow chart 200 representing one embodiment of a method for guiding consumers through category-based transactions, i.e., the establishment of a registry at an online marketplace, is shown. At step 210, the user requests to establish a registry at the marketplace. For example, the user may log into the marketplace by entering his or her screen name and password, and may visit the "baby" or "wedding" section, or any other appropriate section related to a registry that the user wishes to create.

At step 220, the user may optionally select a theme j associated with his or her registry. For example, if the registry is intended to be associated with a wedding, the user may select a theme related to his or her stage in life (e.g., "Just Starting Out," "Second Time Around" or "Empty Nesters"), or the setting for or style of his or her wedding (e.g., "Classic," "Tropical," "Modern" or "Vineyard"). If the registry is intended to be associated with the birth of a child, the user may select a theme relating to a price range (e.g., "Economy," or "Top-of-the-Line") or a style (e.g., "Trendy," "Sports" or "Modern") of the gifts that he or she prefers.

At step 230, the system will display a plurality of n product categories to the user. For example, for a wedding registry, the categories may include those relating to new appliances, furniture, cookware or other suitable wedding gifts. For a baby registry, the categories may include essential gifts such as clothing, baby care products, safety equipment or the like. At step 240, the user may select one of the n categories as the selected category i, to act as a starting point for creating his or her registry.

At step 250, the system will display an array of products corresponding to theme j and within the selected category i. For example, if the user selects a theme of "Jungle" for his or her baby registry, and the selected category is "Bedding," the system may display a number of different bedding products with jungle-themed prints, such as crib sheets and blankets depicting jungle animals or vegetation. If the user selects a theme of "Classic" for his or her wedding registry, and the selected category is "Cookware," the system may display a variety of models of standard stainless steel pots and pans of a classical style.

At step 260, the user selects one or more of the products displayed in the array, and at step 270, the registry is updated to include the selected products. At step 280, it is determined whether the user will continue creating the registry. For example, the system may automatically close the registry once the user has selected at least one product in each category, or may prompt the user as to whether he or she wishes to continue after reviewing each category. If the user wishes to continue creating his or her registry, then at step 285, the system will advance to the next category, i.e., by setting the value of i to i+1, and display a new array of products corresponding to theme j and in the next category.

Accordingly, the systems and methods of the present invention may guide consumers through category-based transactions in a structured, efficient manner, by requesting personalized information regarding the consumer or the consumer's goals or purposes in conducting the transactions, and using that information, along with the histories or preferences of other consumers who have conducted the same transactions in the past, to efficiently and manageably present product offerings at the online marketplace in a more efficient manner, and to more narrowly focus the listings of available items to the consumer.

Moreover, as a user creates a registry, and the online marketplace provides recommendations for items to the user, the online marketplace may continue to refine the scope of the recommendations presented to the user based on the user's selections. For example, when a user adds a particular car seat to a baby registry, an online marketplace may recommend a stroller that is compatible with the car seat that was added to the baby registry, or another stroller that was selected or purchased by others who previously added the car seat to their baby registries.

Figure 3:
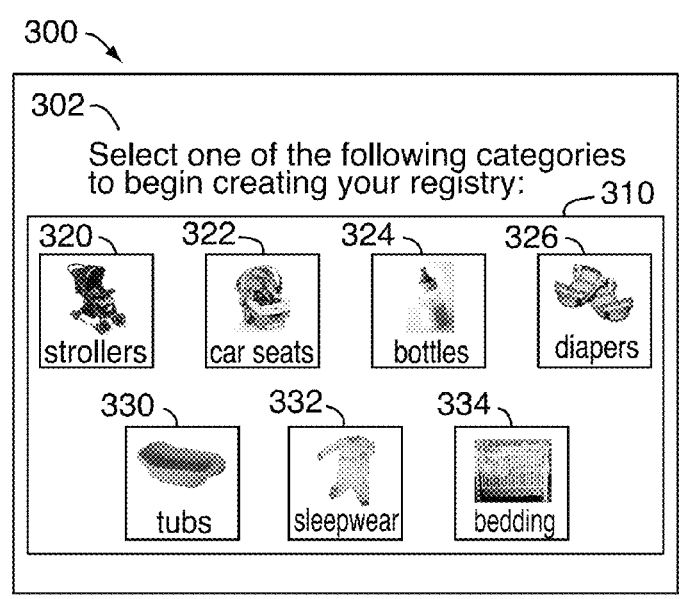
FIG. 3 is a user interface for creating a registry in accordance with embodiments of the present disclosure.
Figure 4A:
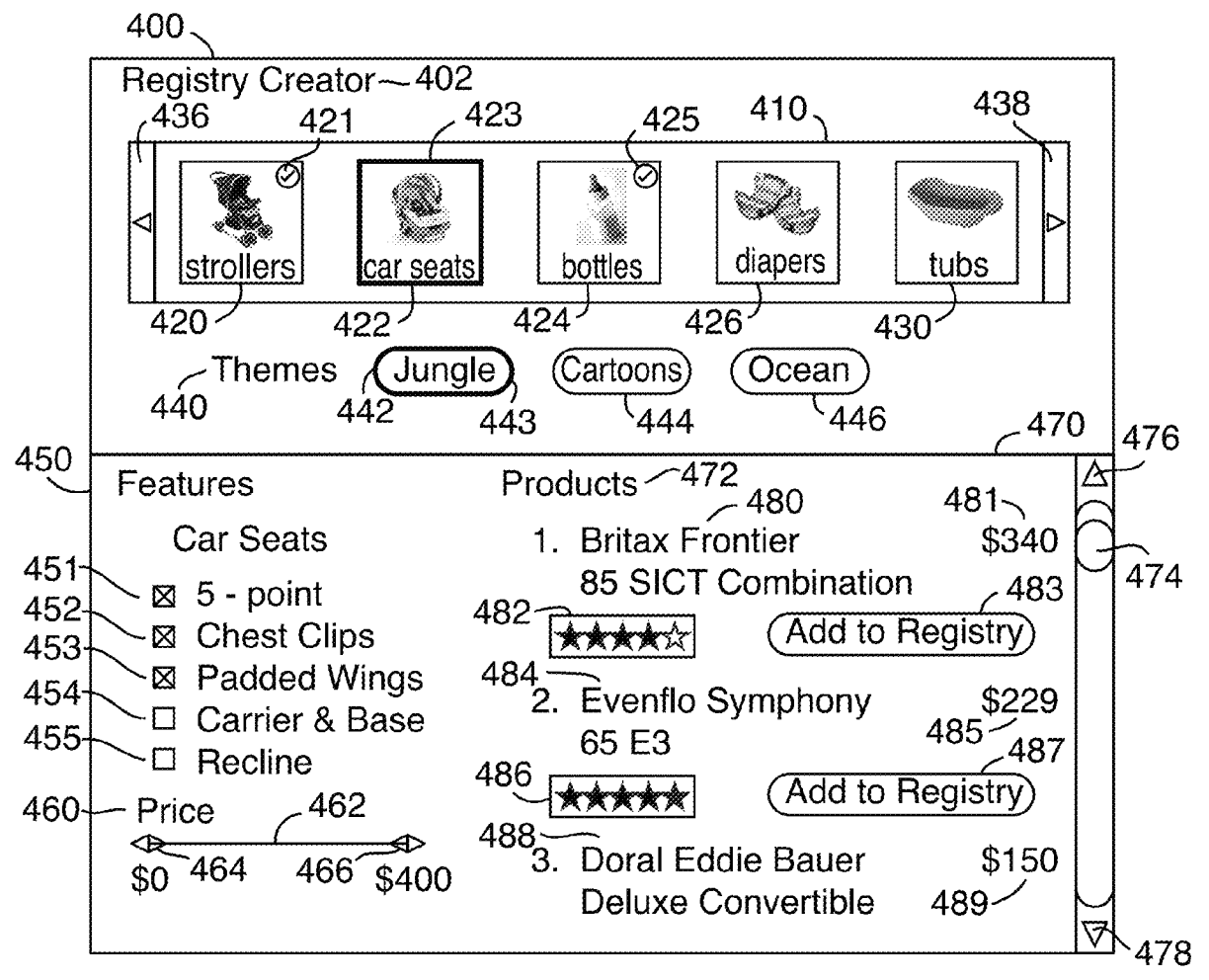
Figure 4B:
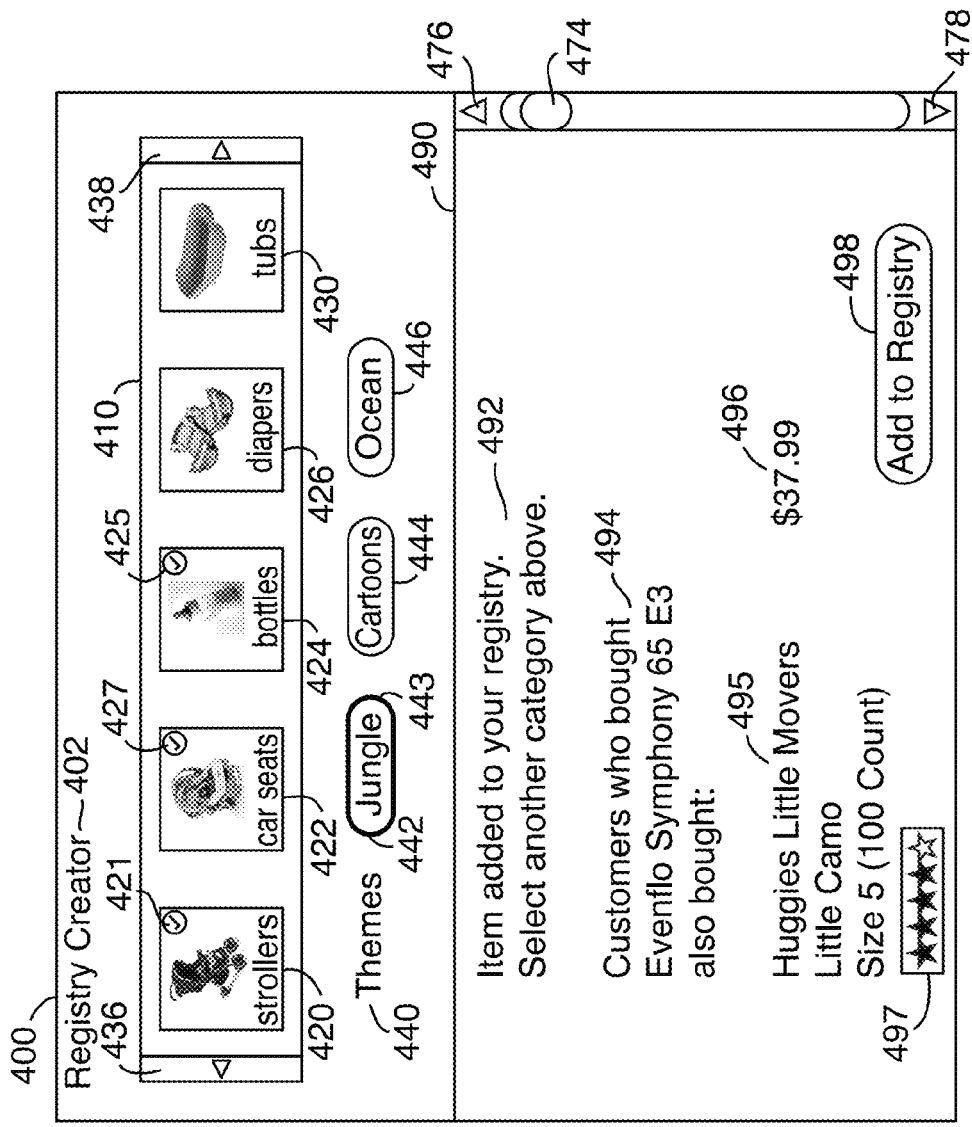

Referring to FIGS. 3, 4A and 4B, graphical user interfaces 300, 400 for utilizing the systems and methods of the present invention are shown. The graphical user interfaces 300, 400 may be displayed or expressed, for example, in a web browser 12 operating on a computer 14 utilized by a customer 10, in the system 8 shown in FIG. 1.

Referring to FIG. 3, the user interface 300 includes a message 302 containing instructions to the user, and an array 310 including icons corresponding to various registry categories. For example, the array 310 includes icons corresponding to the categories Strollers 320, Car Seats 322, Bottles 324, Diapers 326, Tubs 330, Sleepwear 332 and Bedding 334. The user may begin the process of creating a registry by selecting one of the icons, and the category corresponding to the selected icon will act as a starting point for the creation of the user's baby registry.

Referring to FIG. 4A, a user interface 400 for creating the registry is shown. The user interface 400 includes a title 402, a persistent menu bar 410 (or slider bar), theme buttons 440, a features section 450 and a products section 470. The persistent menu bar 410 includes icons corresponding to each of the categories shown in the array 310 of FIG. 3, including the categories Strollers 420, Car Seats 422, Bottles 424, Diapers 426 and Tubs 430. The persistent menu bar 410 also includes left and right scroll buttons 436, 438, respectively, for advancing between or among the icons representing categories, including those that are not visible to the user when the number of categories exceeds the available space within the persistent menu bar 410. The theme buttons 440 include a plurality of buttons 442, 444, 446 which may be selected by a user to indicate the theme of the products in the selected category 422 ("Car Seats") that are listed in products section 470.

Within persistent menu bar 410, the frame 423 around the icon corresponding to the selected category 422 ("Car Seats") is emboldened, indicating that this category has been selected by the user, and that the products listed in the products section 470 pertain to this category. Additionally, and also within persistent menu bar 410, the icons corresponding to categories 420, 424 ("Strollers," "Bottles") include check marks 421, 425 indicating that the user has already viewed or selected recommended products within these categories.

The features section 450 provides a number of product features which may be selected by the user in order to narrow the recommended product listings displayed in the products section 470 based on the user's preferences. For example, the features section 450 includes check boxes 451, 452, 453, 454, 455 which enable a user to select features associated with the products in the selected category 422 ("Car Seats"), and a slider bar 460 enabling users to define the low end 464 and the high end 466 of the price range 460 of the products to be recommended to the user. As is shown in FIG. 4A, the user has selected check boxes 451, 452, 453 corresponding to five-point harnesses, chest clips and padded wings, and each of the products 482, 484, 488 listed in the product section 470 includes these features. Likewise, the user has defined a price range 460 of $0 to $400, and each of the products 482, 484, 488 listed in product section 470 has a price falling within this range.

The products section 470 includes a list of recommended items corresponding to the selected theme 442 ("Jungle") and in the selected category 422 ("Car Seats"). Each of the recommended items displayed in the products section 470 is consistent with the selected features 451, 452, 453 and has a price falling within the price range 460 defined in the features section 450. The products section 470 further includes a title 472, as well as the names 480, 484, 488, prices 481, 485, 489 and customer ratings 482, 486 of each of the products shown therein. Each of the products also includes a button 483, 487 that may be selected by the user in order to add the product to the registry. Additionally, the products section 470 also includes a scroll bar 474 and arrows 476, 478, which enable the user to scroll between and among the recommended products listed in the products section 470.

When a user selects one of the buttons 483, 487, the selected product is added to the registry. Referring to FIG. 4B, a user interface 400 is shown, after product 484 has been added to the registry. The user interface 400 includes a confirmation 492 that the selected product 484 was added to the registry, and also a prompt to select another category. The user interface 400 also includes a product recommendation 494 based on the selected product, including the name of the recommended product 495, the price 496 of the recommended product, its customer rating 497 and a button 498 that may be selected by the user to add the recommended product 495 to his or her registry.

Product recommendations, such as the recommendation 494 shown in FIG. 4B, may be identified and provided to users on any basis. For example, the recommendations may identify products that were added to registries or purchased by people who also added the product 484 to their registries, or may include accessories for the product 484. Additionally, the recommendations may be provided based on customer ratings, such as the ratings 482, 486, 497 shown in FIGS. 4A and 4B, or on recommendations made by other users who created registries for the same purpose or having the same or similar themes. Product recommendations may also be drawn from excerpts of product reviews or other written literature or summaries of certain products.

A user's progress in creating a category-based registry may be depicted in a persistent menu bar or interface, such as is shown in reference numeral 410 in FIGS. 4A and 4B. In a preferred embodiment, the persistent menu bar includes icons corresponding to each of the categories associated with the registry. After the user views or selects one or more items in one category for addition to the registry or reviews icons in that category, the systems and methods of the present invention may mark the icon corresponding to the category with an indicator, such as the check marks 421, 425 shown in FIG. 4A, indicating that items have already been viewed or selected from the marked category. Additionally, the user may advance from category to category by selecting one or more of the icons in the persistent menu bar, to review items in the category associated with the selected icon. Accordingly, the persistent menu bar acts as a visual guide indicative of the user's progress in creating the registry, and a tool for navigating between and among the various categories associated with a registry.

In a preferred embodiment, the persistent menu bar or interface is positioned substantially horizontally, and fixed at or near the top of a screen or interface, such as is shown in FIGS. 4A and 4B. However, the persistent menu bar may be located anywhere within a screen or interface in accordance with the systems and methods of the present disclosure.

Figure 5:
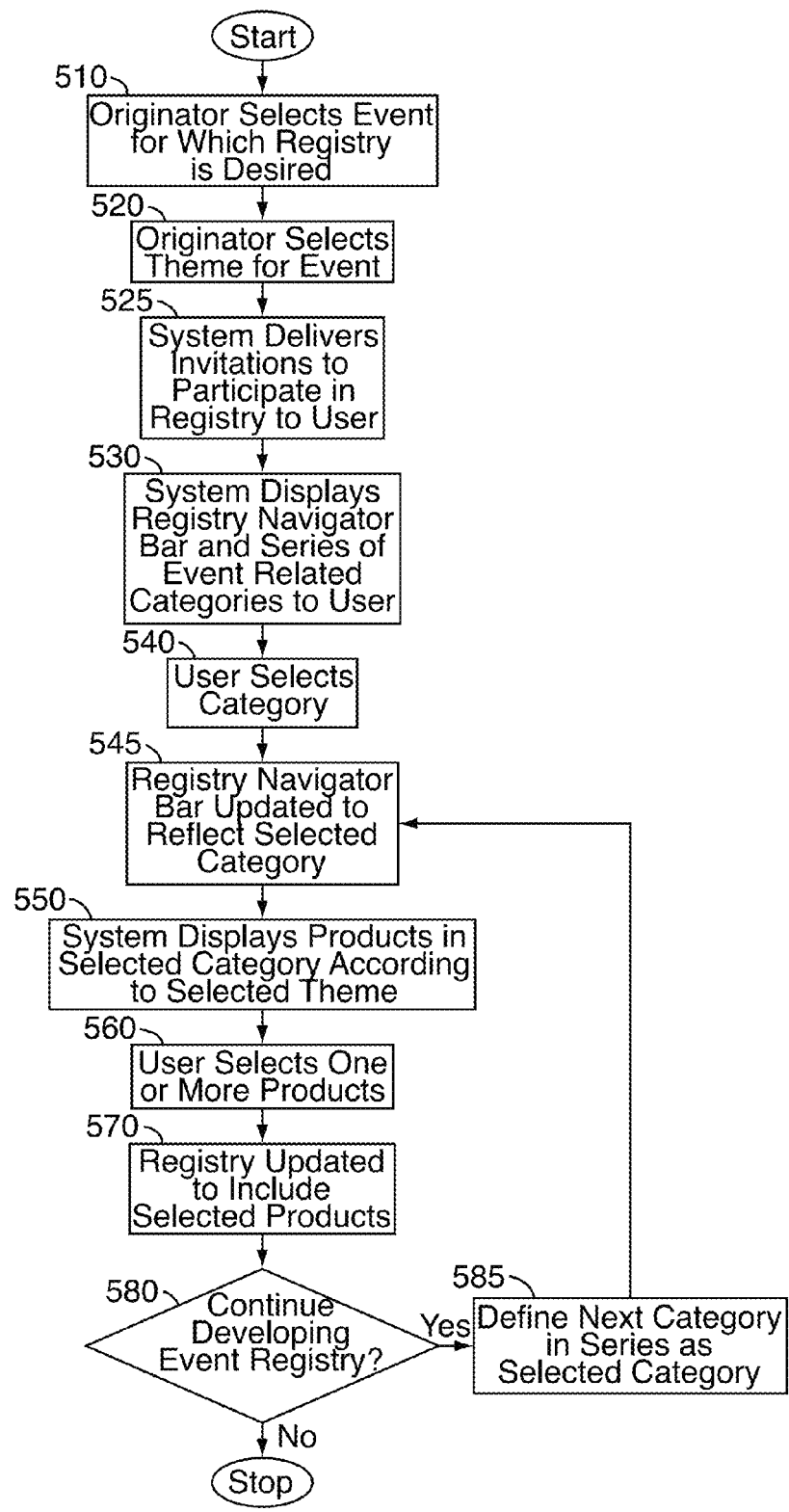
FIG. 5 is a flow chart of a method for creating a registry at an online marketplace, in accordance with embodiments of the present disclosure.

Referring to FIG. 5, a flow chart 500 representing one embodiment of a method for establishing a registry at an online marketplace is shown. Except where otherwise noted, reference numerals preceded by the number "5" in FIG. 5 indicate elements that are similar to elements having reference numerals preceded by the number "2" in FIG. 2, or elements having reference numerals preceded by the number "5" in FIG. 5.

At step 510, an originator visits an electronic commerce system and selects an event for which a registry is desired, and at step 520, the originator selects a theme for the event. For example, a maid of honor may log into an online marketplace to create a bridal registry for a bride's wedding shower, and may select a theme, such as "Destination Wedding" or "Contemporary" for the bridal registry.

At step 525, the system delivers invitations to one or more users, inviting them to participate in the registry. For example, the who originated the registry may provide the system with electronic mail addresses of the members of the bride's wedding party, or of the other wedding guests, and the system may deliver E-mail invitations to those individuals.

At step 530, the system may display a navigator bar, containing a series of event-related categories, to a user of the system. For example, the system may display a persistent menu bar including the categories of items relating to the bridal registry, e.g., "Cookware," "Cutlery" and "Electronics." At step 540, the user may select a category, and at step 545, the navigator bar may be updated to reflect the selected category. For example, one bridesmaid may decide to review items in the category "Cookware" for addition to the registry.

At step 550, the system may display a plurality of products in the selected category according to the selected theme. For example, if the selected category is "Electronics," and the selected theme is "Contemporary," then the online marketplace may display a series of high-definition televisions, mobile phones or tablet computers. At step 560, the user selects one or more of the displayed products for addition to the registry, and at step 570, the registry is updated to include the selected products.

At step 580, the system determines whether the user wants to continue developing the registry. If the user wishes to review additional categories of items, then at step 585, the next category in the navigator bar is defined as the selected category, and the navigator bar is updated accordingly at step 545.

Accordingly, the systems and methods of the present invention may be utilized by one or more individuals to participate in a guided, category-based search for items to be added to a registry, shopping list or the like. In such a manner, the registry or shopping list may be prepared as a collaborative effort, and each of the guided, category-based features may be utilized by each of the users who participate in the effort. For example, when members of a bridal party work together to create a bridal registry, each of the bridesmaids may review recommended items grouped into categories, and may add items to the registry based on individually selected themes.

Figure 6B:
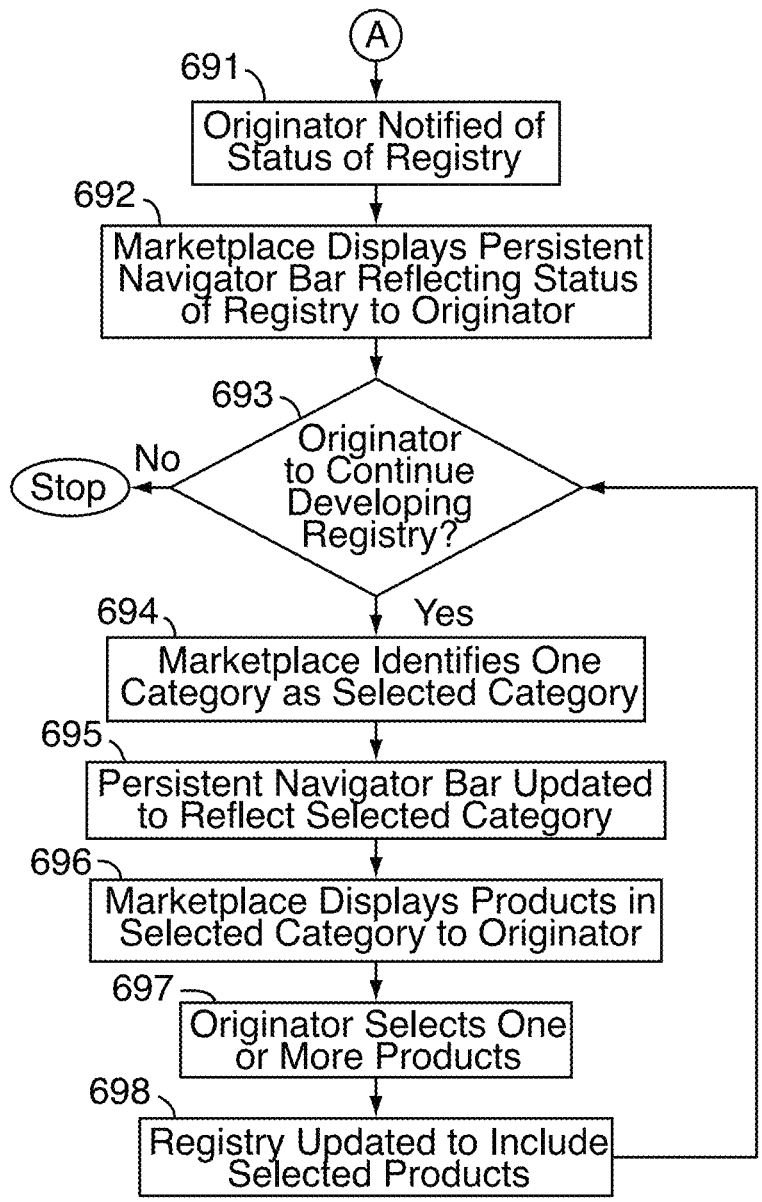

The systems and methods of the present invention may be utilized by a user to invite product recommendations from one or more additional persons, such as where the user is not familiar with the experience or event for which a registry is desired, and the user and the one or more persons may therefore collaborate on the creation of the registry. For example, the one or more persons may recommend categories of products to be included in the registry, and the systems and methods of the present invention may display recommended products in those categories to be reviewed by those who visit the marketplace to add products to the registry. Referring to FIGS. 6A and 6B, a flow chart 600 representing one embodiment of a method for establishing a registry at an online marketplace is shown. Except where otherwise noted, reference numerals preceded by the number "6" in FIGS. 6A and 6B indicate elements that are similar to elements having reference numerals preceded by the number "2" in FIG. 2.

At step 610, an originator establishes a registry at an online marketplace and identifies one or more collaborators who will assist the originator in creating the registry. For example, an expectant mother may visit an online marketplace to create a registry, and may identify one or more friends or relatives from whom she would like input as to the creation of the registry.

At step 625, the marketplace may deliver invitations to one or more collaborators, such as by electronic mail or other means. At step 630, a collaborator who visits the marketplace may identify one or more categories of products to be reviewed by those who visit the registry. For example, when one of the expectant mother's friends or relatives visits the marketplace, he or she may identify categories of products by any known means, such as by entering one or more keywords corresponding to the categories into a search engine (e.g., "Pacifiers"), selecting one or more categories from a list, or dragging and dropping icons corresponding to one or more categories onto a persistent navigator bar.

At step 635, the marketplace may display a persistent navigator bar reflecting the status of the registry to the collaborator. For example, a persistent navigator bar including icons corresponding to one or more product categories designated by the originator or any other collaborators, such as the persistent menu bar 410 and icons 420, 422, 424, 426, 430 shown in FIGS. 4A and 4B, may be displayed to him or her. The persistent navigator bar may indicate whether products from any of the categories have been added to the registry, or whether the categories have been otherwise viewed by one or more other collaborators, with an indicator such as the check marks 421, 425, 427 shown in FIGS. 4A and 4B.

At step 640, the collaborator may select one or more of the categories shown in the persistent navigator bar. At step 645, the persistent navigator bar may be updated to reflect the selected category, such as by marking an icon associated with the selected category with an emboldened frame 423 as is shown in FIG. 4A, and at step 650, the marketplace may display one or more recommended products in the selected category to the collaborator.

At step 660, the collaborator may select one or more of the displayed products for inclusion in the registry, and at step 670, the registry may be updated to reflect the inclusion of the one or more selected products. At step 680, it may be determined whether the collaborator is to continue adding products to the registry. For example, the collaborator may be prompted to continue adding products, or may select an icon corresponding to another of the products in the persistent navigator bar. If the collaborator is to continue reviewing products for inclusion in the registry, then at step 685, another of the displayed categories is designated as the selected category, and the process returns to step 645.

If the collaborator is finished reviewing products in connection with the registry, then at step 690, it is determined whether any other collaborators are to contribute to the registry. For example, the open period for friends and relatives to contribute to an expectant mother's baby registry may time out or otherwise expire, or the expectant mother may elect to close the participation of any outside collaborators at any time. If any other collaborators are to continue contributing to the registry, then the process returns to step 630.

If no other collaborators are to contribute to the registry, then at step 691, the originator is informed of the registry's status. For example, the marketplace may transmit an electronic message, such as an electronic mail or short or multimedia messaging service (SMS or MMS) text message, to the originator. The originator may then return to the marketplace and, at step 692, a persistent navigator bar reflecting the status of the registry may be displayed. For example, when an expectant mother returns to the marketplace after her friends and relatives have added products to the registry, a persistent navigator bar (such as the persistent menu bar 410 shown in FIGS. 4A and 4B) may be displayed including icons corresponding to the categories of items in the registry (such as icons 420, 422, 424, 426, 430 shown in FIGS. 4A and 4B) and indicators identifying any categories for which one or more items has been added to the registry (such as check marks 421, 425, 427 shown in FIG. 4B).

If the originator elects to continue developing the registry at step 693, then at step 694, the marketplace may identify another of the categories represented in the persistent navigator bar as a selected category, and at step 695, update the persistent navigator bar to reflect the selected category. At step 696, the marketplace may display products in the selected category, and at step 697, the originator may select one or more products. At step 698, the registry may be updated to include the one or more products selected by the originator, and the process returns to step 693.

As is set forth above, the systems and methods of the present invention are not limited to creating gift registries, and may be used to aid a user in planning for parties, receptions or other events. Referring to FIG. 7, a user interface 700 for planning for an event is shown. Except where otherwise noted, reference numerals preceded by the number "7" in FIG. 7 indicate elements that are similar to elements having reference numerals preceded by the number "4" in FIGS. 4A and 4B.

Referring to FIG. 7, a planner 700 for preparing for a tailgating party in connection with a sporting event is shown. The planner includes a title 702, a series of information 704 regarding the sporting event, a persistent menu bar 710 (or slider bar), theme buttons 740, a details section 750 and a products section 770.

The persistent menu bar 710 includes a number of categories of items for incorporation into the planned tailgate party registry. For example, because the sporting event is scheduled to begin at noon, the persistent menu bar 710 includes categories of breakfast and lunch, as well as beverages and decorations. If the sporting event was scheduled to being in the evening, then the persistent menu bar 710 may recommend other meal options, such as dinner or dessert. The theme buttons 740 include a plurality of buttons 742, 744, 746 which may be selected by a user to indicate the theme of the products in the selected category 722 ("Lunch") that are listed in products section 770. As is shown in FIG. 7, the user may select themes related to the home team, the visiting team, or a nearby holiday (e.g., Halloween).

Within persistent menu bar 710, the frame 723 around the icon corresponding to the selected category 722 ("Lunch") is emboldened, indicating that this category has been selected by the user, and that the products listed in the products section 770 pertain to this category. Additionally, and also within persistent menu bar 710, the icon corresponding to category 720 ("Breakfast") includes a check mark 721, indicating that the user has already viewed recommended products within this category, and added products to the tailgate party registry from this category.

The details section 750 includes an entry box 751 for indicating the number of guests attending the tailgate party, along with check boxes 752, 753, 754 which enable a user to identify the available equipment (e.g., gas grill, charcoal grill, tent) that will be available at the tailgate party. The details section 750 also includes a summary 760 of the total cost, as well as a summary 762 of the cost per person, of the items added to the tailgate party registry.

The product section 770 includes a title 772 relating to the selected category 722 ("Lunch"), as well as the names 780, 784 and prices 781, 785 of each of the products shown therein. Each of the products also includes a button 783, 787 that may be selected by the user in order to add the product to the registry. Additionally, the products section 770 also includes a scroll bar 774 and arrows 776, 778, which enable the user to scroll between and among the recommended products listed in the products section 770. When a user selects one of the buttons 783, 787, the selected product is added to the registry. Additionally, because the user selected check box 752, indicating that a grill will be available at the tailgate party, each of the products 780, 784 shown in the products section 770 may be cooked on a grill. If the user had not selected check box 752 or 753, then the systems and methods of the present invention would recommend other lunch ideas that need not be cooked and do not require the use of a grill (i.e., sandwiches).

The products section 770 also includes product recommendations 782, 786 that are related to the listed products 780, 784. The user may select these links to learn more about the recommended products, and to add them to the tailgate party registry.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, the systems and methods described herein may be adapted to provide for any guided, category-based planning or preparation through online marketplaces or user interfaces for any type of occasion or event, and are not limited to the preparation of registries or the planning of parties or receptions.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having a computer-executable component for causing a computer system to perform a method for generating a persistent menu bar for creating a collaborative list, the method comprising:
    generating a display of a plurality of product categories on a first screen to an originating user;
    receiving a selection of a first product category of the plurality of product categories from the originating user over a network;
    receiving information identifying a plurality of collaborating users from the originating user over the network;
    transmitting an invitation to collaborate in creating the collaborative list to at least one of the plurality of collaborating users over the network;
    generating a display of the plurality of product categories on at least a second screen to the at least one of the plurality of collaborating users;
    receiving a selection of a second product category of the plurality of product categories from the at least one of plurality of collaborating users over the network;
    generating a display of the persistent menu bar in a first portion of at least the second screen, wherein the persistent menu bar includes at least a first icon indicative of the first product category and a second icon indicative of the second product category;
    generating a display of a first plurality of products in a second portion of at least the second screen, wherein each of the first plurality of products is in the first product category;
    receiving a selection of at least one of the first plurality of products;
    adding information regarding the at least one of the first plurality of products to the collaborative list; and
    after the information regarding the at least one of the first plurality of products is added to the collaborative list,
        generating a display of a second plurality of products in the second portion of at least the second screen, wherein each of the second plurality of products is in the second product category.

2. The non-transitory computer-readable medium of claim 1, the method further comprising:
    after the information regarding the at least one of the first plurality of products is added to the collaborative list,
        updating the persistent menu bar in the first portion of at least the second screen to reflect a status of the collaborative list.

3. The non-transitory computer-readable medium of claim 1, the method further comprising:
    after the information regarding the at least one of the first plurality of products is added to the collaborative list,
        identifying at least one recommended product in the second product category based at least in part on the at least one of the first plurality of products,
        wherein display of the at least one recommended product in the second product category is one of the second plurality of products displayed in the second portion of at least the second screen.

4. A computer-implemented method for creating a collaborative list of a first type on behalf of a first user comprising:
    identifying a first category selected by a second user, wherein the second user is associated with the first user;
    generating a display of a persistent interface including icons representing each of a plurality of categories to a third user on a computer display, wherein the persistent interface indicates a status of the collaborative list, wherein each of the plurality of categories is common to collaborative lists of the first type, and wherein the first category is one of the plurality of categories;
    receiving a selection of a first one of the icons of the persistent interface from the third user, wherein the first selected icon corresponds to the first category;
    generating a display of a first plurality of items to the third user on the computer display by at least one computer processor, wherein each of the first plurality of items is in the first category;
    receiving a selection of an item of the first plurality of items from the third user;
    adding the selected item of the first plurality of items to the collaborative list by the at least one computer processor; and
    after the selected item of the first plurality of items is added to the collaborative list,
        modifying the persistent interface based at least in part on the selection of the selected item of the first plurality of items; and
        generating a display of a second plurality of items to the third user on the computer display by the at least one computer processor,
        wherein each of the second plurality of items is in a second one of the plurality of categories.

5. The method of claim 4, further comprising:
receiving a selection of an item of the second plurality of items from the third user;
adding the selected item of the second plurality of items to the collaborative list; and
after the selected item of the second plurality of items is added to the collaborative list,
    modifying the persistent interface based at least in part on the selection of the selected item of the second plurality of items;
    generating a display of the persistent interface to the third user on a computer display;
    generating a display of a third plurality of items to the third user on the computer display by the at least one computer processor,
    wherein each of the third plurality of items is in a third one of the plurality of categories.

6. The method of claim 4, comprising:
after the selected item of the first plurality of items is added to the collaborative list, receiving an indication that none of the second plurality of items is to be added to the collaborative list; and after the indication that none of the second plurality of items is to be added to the collaborative list is received, generating a display of a third plurality of items to the third user on the computer display by the at least one computer processor, wherein each of the third plurality of items is in a third one of the plurality of categories.

7. The method of claim 6, wherein the indication comprises a selection of a third one of the icons of the persistent interface, and wherein the third selected icon corresponds to the third category.

8. The method of claim 4, further comprising:

marking the first one of the plurality of icons in the persistent interface with an indicator by the at least one computer processor, wherein the indicator indicates that at least one item in the first category has been added to the collaborative list.

9. The method of claim 4, further comprising:

receiving a selection of an item of the second plurality of items from the third user; and adding the selected item of the second plurality of items to the collaborative list by the at least one computer processor;

after the selected item of the second plurality of items is added to the collaborative list, modifying the persistent interface based at least in part on the selection of the selected item of the second plurality of items;

generating a display of the persistent interface to a fourth user on a computer display;

generating a display of a third plurality of items to the fourth user on the computer display by the at least one computer processor, wherein each of the third plurality of items is in a third one of the plurality of categories.

10. The method of claim 4, wherein generating the display of the first plurality of items to the third user further comprises:

receiving a selection of a theme from the second user; and identifying the first plurality of items by the at least one computer processor, wherein each of the first plurality of items is associated with the theme.

11. The method of claim 4, further comprising:

receiving a selection of a second one of the icons of the persistent interface, wherein the second selected icon corresponds to a third category;

after the selection of the one of the icons of the persistent interface is received, generating a display of a third plurality of items on the at least one computer display by the at least one computer processor, wherein each of the third plurality of items is in the third category.

12. The method of claim 4, wherein generating the display of the first plurality of items on the at least one computer display further comprises:

identifying at least one recommended item, wherein at least one of the first plurality of items or the second plurality of items includes the at least one recommended item.

13. The method of claim 12, wherein identifying the at least one recommended item further comprises:

identifying at least one customer who previously purchased the selected item of the first plurality of items;

identifying at least one additional item purchased by the at least one customer; and designating the at least one additional item as the at least one recommended item.

14. The method of claim 12, wherein identifying the at least one recommended item further comprises:

identifying an accessory of the selected item of the first plurality of items; and designating the accessory as the at least one recommended item.

15. The method of claim 4, further comprising:

transmitting an invitation to participate in the collaborative list to a plurality of recipients over a network, wherein the second user is one of the plurality of recipients.

16. The method of claim 15, wherein the invitation includes a hyperlink to at least one network page comprising information regarding the collaborative list, and wherein receiving the selection of the first one of the icons of the persistent interface further comprises:

after the invitation has been transmitted to the plurality of recipients, receiving a selection of the hyperlink from the second user over the network at a first time, and generating a display of the persistent interface to the second user on the at least one computer display, wherein the persistent interface indicates a status of the collaborative list as of the first time.

17. The method of claim 4, wherein the first type of the collaborative list is a baby registry, and wherein each of the plurality of categories is common to baby registries.

18. A computer system comprising a computer having at least one computer processor, wherein the computer is adapted to execute a computer program causing the computer system to perform a method comprising:

receiving a request to create a collaborative list of a first type from an originating user over a network;

transmitting at least one electronic invitation to participate in creating the collaborative list to a plurality of invited users over the network, wherein the at least one electronic invitation comprises information identifying at least one network site associated with the collaborative list;

generating a display of a first persistent menu bar to a first invited user in a first portion of a first computer display at a first time using the at least one computer processor, wherein the first persistent menu bar includes a plurality of icons, wherein each of the plurality of icons corresponds to one of a plurality of categories common to collaborative lists of the first type, and wherein the first persistent menu bar reflects a first status of the collaborative list at the first time;

receiving a selection of one of the plurality of icons from the first invited user over the network;

identifying a first one of the plurality of categories corresponding to the selected one of the plurality of icons;

identifying at least one recommended item in the first one of the plurality of categories;

generating a display of a first plurality of items in the first one of the plurality of categories to the first invited user in a second portion of the first computer display using the at least one computer processor, wherein the first plurality of items includes the at least one recommended item receiving an indication that the first invited user has reviewed the first plurality of items over the network;

modifying the first persistent menu bar based at least in part on the indication that the first invited user has reviewed the first plurality of items; and generating a display of a second plurality of items to the first invited user in the second portion of the first computer display using the at least one computer processor, wherein at least one of the second plurality of items is in a second one of the plurality of categories.

19. The computer system of claim 18, wherein the indication comprises a selection of one of the first plurality of items by the first invited user, and wherein the method further comprises:

adding the selected one of the first plurality of items to the collaborative list.

20. The computer system of claim 18, wherein the indication comprises a selection of one of the plurality of categories in the first persistent menu bar by the first invited user.

21. The computer system of claim 18, wherein the method further comprises:

generating a display of a second persistent menu bar to the originating user in a first portion of a second computer display at a second time using the at least one computer processor, wherein the second persistent menu bar includes the plurality of icons, and wherein the second persistent menu bar reflects a second status of the collaborative list at the second time.

22. The computer system according to claim 21, wherein the method further comprises:

generating a display of a third plurality of items to the originating user in a second portion of the second computer display, wherein at least one of the third plurality of items is in a third one of the plurality of categories.

23. The computer system according to claim 18, wherein the method further comprises:

after the at least one electronic invitation to participate in creating the collaborative list is transmitted to the plurality of invited users, receiving an identification of at least one recommended category from a second invited user, wherein the plurality of categories common to the collaborative lists of the first type includes the at least one recommended category.

\* \* \* \* \*